United States Patent
Ohno et al.

(10) Patent No.: US 10,449,560 B2
(45) Date of Patent: Oct. 22, 2019

(54) OPTICAL PROCESSING NOZZLE AND OPTICAL MACHINING APPARATUS

(71) Applicant: TECHNOLOGY RESEARCH ASSOCIATION FOR FUTURE ADDITIVE MANUFACTURING, Tokyo (JP)

(72) Inventors: Hiroshi Ohno, Yokohama (JP); Yuji Sasaki, Yokohama (JP); Mitsuo Sasaki, Yokohama (JP); Takashi Obara, Yokohama (JP); Kazuyuki Masukawa, Yokohama (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 0 days.

(21) Appl. No.: 14/889,280

(22) PCT Filed: Feb. 25, 2015

(86) PCT No.: PCT/JP2015/055484
§ 371 (c)(1),
(2) Date: Nov. 5, 2015

(87) PCT Pub. No.: WO2016/135907
PCT Pub. Date: Sep. 1, 2016

(65) Prior Publication Data
US 2017/0050198 A1    Feb. 23, 2017

(51) Int. Cl.
*B05B 1/24* (2006.01)
*B33Y 30/00* (2015.01)
(Continued)

(52) U.S. Cl.
CPC .............. *B05B 1/24* (2013.01); *B22F 3/1055* (2013.01); *B23K 26/144* (2015.10);
(Continued)

(58) Field of Classification Search
CPC .... B05B 1/24; B23K 26/342; B23K 26/1476; B23K 26/144; B22F 3/1055; B22F 2003/1056
(Continued)

(56) References Cited

U.S. PATENT DOCUMENTS 5,055,696 A    10/1991  Haraichi et al.
5,556,560 A *   9/1996  Ahola ................. B23K 9/18
                                            219/121.45
(Continued)

FOREIGN PATENT DOCUMENTS

DE    10 2004 034 777 A1    3/2006
DE    20 2008 002 271 U1    4/2008
(Continued)

OTHER PUBLICATIONS

International Search Report (ISR) dated Jun. 17, 2015 for International Application No. PCT/JP2015/055484.
(Continued)

*Primary Examiner* — Dana Ross
*Assistant Examiner* — Joseph M Baillargeon
(74) *Attorney, Agent, or Firm* — Ladas & Parry LLP (57) ABSTRACT

An optical processing nozzle that homogeneously supplies a fluid to a processing surface in optical processing. The optical processing nozzle includes a beam path that is arranged so that a beam can pass through the beam path towards a processing surface in order to perform processing using a beam guided from a light source, and a channel structure that is arranged around the beam path and is configured to eject a fluid towards the processing surface.
(Continued)

The channel structure includes an inflow port through which the fluid flows, at least two passage holes through which the fluid flowing from the inflow port passes, a channel that guides the fluid from the inflow port to the passage holes, and an ejection port from which the fluid having passed through the at least two passage holes is ejected toward the processing surface.

11 Claims, 10 Drawing Sheets

(51) Int. Cl.
*B23K 26/144* (2014.01)
*B23K 26/342* (2014.01)
*B29C 64/153* (2017.01)
*B29C 64/20* (2017.01)
*B22F 3/105* (2006.01)
*B23K 26/14* (2014.01)
*B33Y 40/00* (2015.01)

(52) U.S. Cl.
CPC ........ *B23K 26/1476* (2013.01); *B23K 26/342* (2015.10); *B29C 64/153* (2017.08); *B29C 64/20* (2017.08); *B33Y 30/00* (2014.12); *B22F 2003/1056* (2013.01); *B33Y 40/00* (2014.12); *Y02P 10/295* (2015.11)

(58) Field of Classification Search
USPC .............. 219/76.11, 121.84, 121.63, 121.64, 219/121.67, 76.1, 121.6, 121.51
See application file for complete search history.

(56) References Cited

U.S. PATENT DOCUMENTS

| | | | |
|---|---|---|---|
| 5,609,781 A | 3/1997 | Kaga et al. | |
| 5,993,554 A * | 11/1999 | Keicher | B23K 26/144 |
| | | | 118/308 |
| 6,118,097 A | 9/2000 | Kaga et al. | |
| 6,288,363 B1 | 9/2001 | Kaga et al. | |
| 2001/0008230 A1 | 7/2001 | Keicher et al. | |
| 2005/0109745 A1 | 5/2005 | Wessner | |
| 2009/0134132 A1 | 5/2009 | Verna et al. | |
| 2012/0195334 A1 | 8/2012 | Wilkiel et al. | |
| 2014/0186549 A1 | 7/2014 | Miyagi et al. | |
| 2016/0207108 A1* | 7/2016 | Daum | B29C 67/0077 |

FOREIGN PATENT DOCUMENTS

| | | | |
|---|---|---|---|
| GB | 2 163 692 A | 3/1986 | |
| JP | 2-62039 A | 3/1990 | |
| JP | 6-99291 A | 4/1994 | |
| JP | 6-190582 A | 7/1994 | |
| JP | 2004-268080 A | 9/2004 | |
| JP | 2009-512556 A | 3/2009 | |
| JP | 2013-75308 A | 4/2013 | |
| JP | 2014-22605 A | 4/2014 | |

OTHER PUBLICATIONS

J-PlatPat English abstract of JP 2-62039 A.
J-PlatPat English abstract of JP 6-190582 A.
J-PlatPat English abstract of JP 6-99291 A.
J-PlatPat English abstract of JP 2014-22605 A.
J-PlatPat English abstract of JP 2004-268080 A.
Japanese Office Action dated Feb. 7, 2017 in connection with corresponding Japanese Application No. 2016-510535.
J-PlatPat English abstract of JP 2013-75308 A.
European Search Report (ESR) dated Sep. 12, 2018 in connection with corresponding European Application No. EP 15 784 917.5.
Espacenet English abstract of DE 10 2004 034 777 A1.

* cited by examiner

OPTICAL PROCESSING NOZZLE AND OPTICAL MACHINING APPARATUS

RELATED APPLICATION

This application is an application under 35 U.S.C. 371 of International Application No. PCT/JP2015/055484 filed on Feb. 25, 2015, the entire contents of which are incorporated herein by reference.

TECHNICAL FIELD

The present invention relates to an optical processing nozzle and an optical machining apparatus.

BACKGROUND ART

In the above technical field, patent literature 1 discloses a laser processing head in which a branched carrier gas flows from a plurality of inflow paths 9 and 10 into a nozzle 4.

CITATION LIST

Patent Literature

Patent literature 1: US Patent Application Publication No. 2005/0109745A1

SUMMARY OF THE INVENTION

Technical Field

In the technique described in this literature, however, a gas is branched outside the nozzle and supplied through a plurality of supply channels. The flow rates of respective gas flows readily vary until the branched gas flows reach the nozzle. That is, the optical processing nozzle cannot homogeneously supply a fluid to a processing surface conventionally.

The present invention enables to provide a technique of solving the above-described problem.

Solution to Problem

One aspect of the present invention provides an optical processing nozzle comprising:
a beam path that is arranged to allow a beam emitted by a light source to pass through the beam path toward a processing surface; and
a channel structure that is arranged around the beam path and is configured to eject a fluid toward the processing surface,
wherein the channel structure includes:
an inflow port through which the fluid flows;
at least two passage holes through which the fluid flowing from the inflow port passes;
a channel that guides the fluid from the inflow port to the passage holes; and
an ejection port from which the fluid having passed through the at least two passage holes is ejected toward the processing surface,
the at least two passage holes are arranged to be spatially symmetrical with respect to the inflow port, and
the ejection port is arranged to be spatially symmetrical with respect to an optical axis of a beam coming out from the beam path.

Another aspect of the present invention provides an optical processing head comprising: the optical processing nozzle; and a condensing optical system device that condenses light emitted by a light source and ejects the light toward a processing surface.

Still other aspect of the present invention provides an optical machining apparatus comprising: the optical processing head; a light source; a light transmitting portion that transmits light emitted by the light source to the optical processing head; a fluid storage device that stores the fluid; and a fluid supply portion that supplies the fluid to the optical processing nozzle.

Advantageous Effects of Invention

The present invention can provide an optical processing nozzle capable of homogeneously supplying a fluid to a processing surface.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
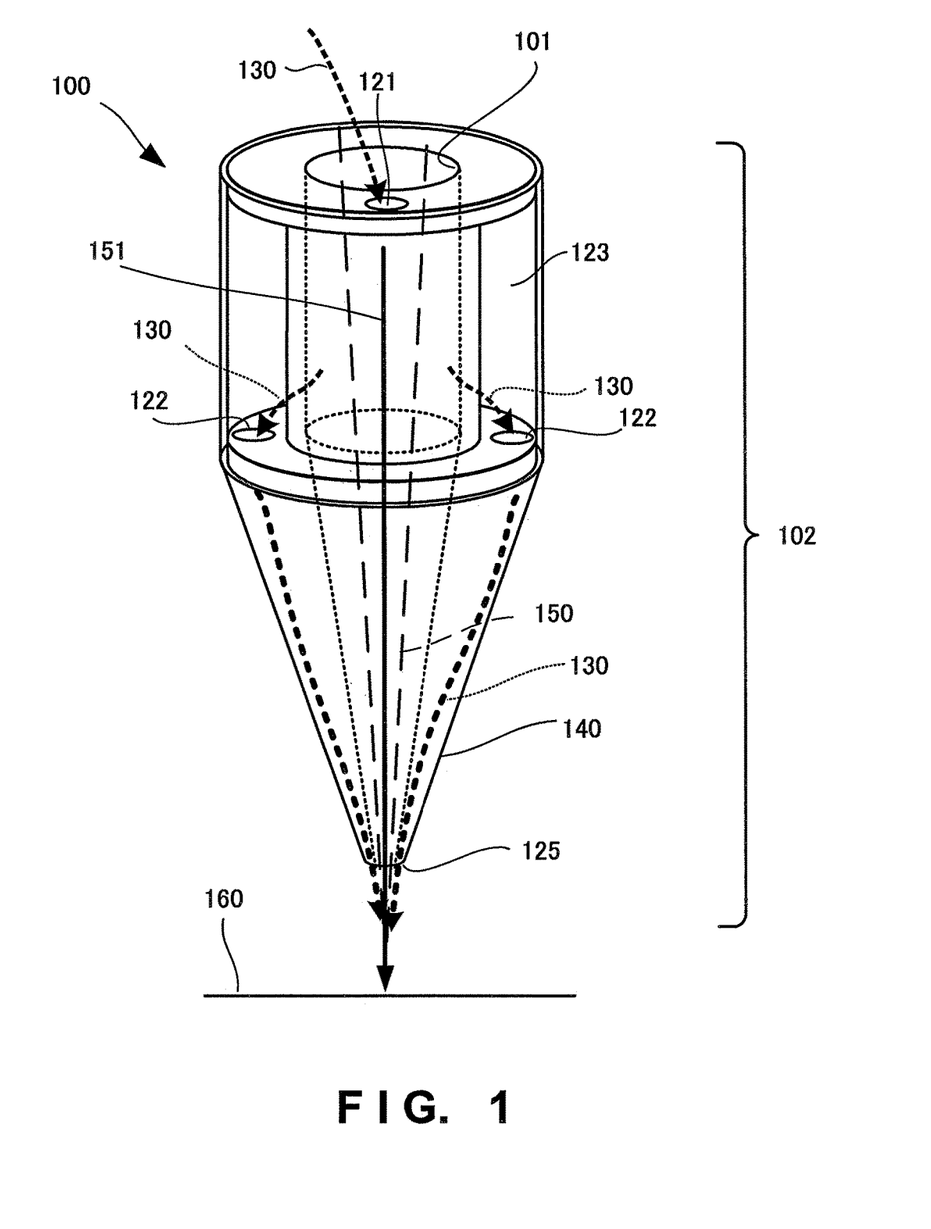
FIG. 1 is a view showing the arrangement of an optical processing nozzle according to the first embodiment of the present invention.

An optical processing nozzle according to the first embodiment of the present invention will be described with reference to FIG. 1. FIG. 1 shows the arrangement of an optical processing nozzle 100 attached to the distal end of the head of an optical machining apparatus. The optical processing nozzle 100 includes a beam path 101 and a channel structure 102.

The beam path 101 is arranged so that a beam 150 can pass through the beam path 101 toward a processing surface 160 in order to perform processing using the beam 150 guided from a light source (not shown). The light source can be, for example, a laser source, an LED, a halogen lamp, or a xenon lamp. The wavelength of a beam is, for example, 1,060 nm in the case of the laser source. However, the wavelength is not limited to this, and the beam 150 is arbitrary as long as it is absorbed by the processing surface 160.

A fluid flowing through the channel structure 102 is, for example, a carrier gas carrying a powder. The powder is, for example, a particle such as a metal particle or a resin particle. The carrier gas is an inert gas and can be, for example, argon gas, nitrogen gas, or helium gas. Further, the fluid is not limited to the carrier gas, and this structure may be used for a purge gas. In this case, since the concentration of the purge gas ejected to the processing surface can be homogenized, degradation of a shaped object by oxidation can be reduced. Note that the channel structure 102 is formed around the beam path 101 in order to eject a fluid 130 toward the processing surface 160.

The channel structure 102 includes an inflow port 121 through which the fluid 130 flows, at least two passage holes 122 through which the fluid 130 flowing from the inflow port 121 passes, and a channel 123 that guides the fluid 130 from the inflow port 121 to the passage holes 122. Further, the channel structure 102 includes an ejection port 125 from which the fluid having passed through the passage holes 122 is ejected toward the processing surface 160. Although the two passage holes 122 are illustrated in FIG. 1, the present invention is not limited to this. Although the passage hole 122 is a hole formed in a thin plate in FIG. 1, the present invention is not limited to this and may employ a pipe-shaped passage hole.

The passage holes 122 are arranged to be spatially symmetrical with respect to the inflow port 121. When the passage holes 122 are rotated about an inflow axis that passes through the center of the inflow port 121 and extends in the inflow direction of a fluid in the inflow port 121, and one passage hole 122 coincides with the other passage hole 122 at a rotation angle of smaller than 360°, the passage holes 122 are considered to be spatially symmetrical with respect to the inflow port 121. When the passage holes 122 are spatially symmetrical with respect to the inflow port 121, if channels from the inflow port 121 to the passage holes 122 have the same shape, fluid conductances become equal. At this time, a gas flowing from the inflow port 121 is equally divided in the passage holes 122, and flow rates in the passage holes 122 become equal.

The ejection port 125 is arranged to be spatially symmetrical with respect to an optical axis 151 of the beam 150 coming out from the beam path 101. When the ejection port 125 is rotated about the optical axis 151, and the ejection port 125 is coincident at a rotation angle of smaller than 360°, the ejection port 125 is considered to be spatially symmetrical with respect to the optical axis 151. Although one ejection port 125 having a rotationally symmetrical shape with respect to the optical axis 151 is illustrated in FIG. 1, the present invention is not limited to this, and an optical processing nozzle including two or more ejection ports also falls within the technical scope. When the ejection port 125 is rotated about the optical axis 151, if the layout (position and shape of the entire ejection port) of the ejection port 125 is coincident at a rotation angle of smaller than 360°, the ejection port 125 is considered to be rotationally symmetrical with respect to the optical axis 151. In particular, the exits of the passage holes 122 may function as ejection ports. In this case, a downstream cone portion 140 becomes unnecessary.

According to the above-described arrangement, the optical processing nozzle 100 capable of homogeneously supplying a fluid to the processing surface with a very simple arrangement can be provided. Since flow rate nonuniformity of a carrier gas on the processing surface can be reduced, the processing accuracy can be improved.

Second Embodiment

Figure 2:
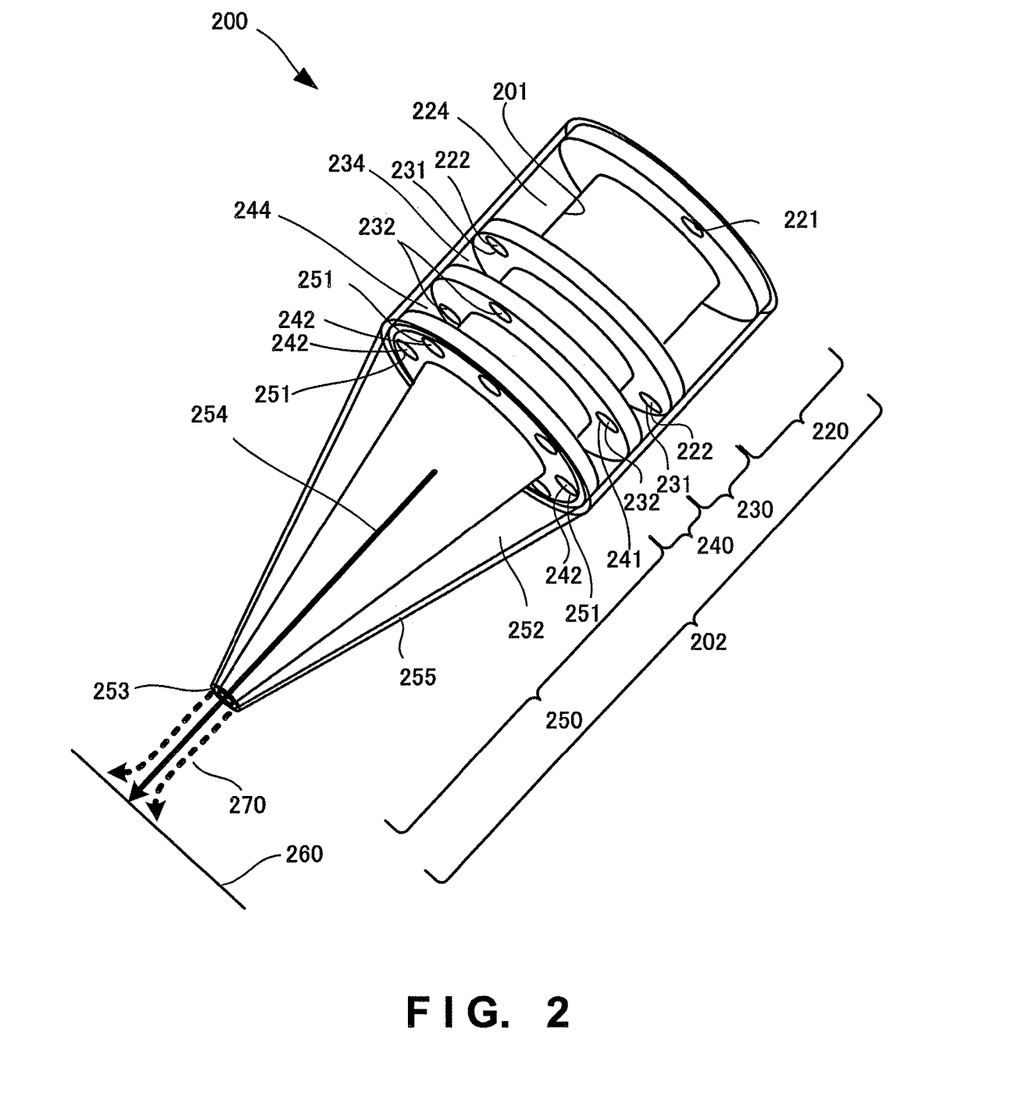
FIG. 2 is a view showing the arrangement of an optical processing nozzle according to the second embodiment of the present invention.

An optical processing nozzle according to the second embodiment of the present invention will be described with reference to FIGS. 2 and 3. FIG. 2 is a view showing the internal arrangement of an optical processing nozzle 200.

The nozzle 200 includes a beam path 201 provided so that a beam can pass through the beam path 201 toward a processing surface 260 in order to perform processing using a beam guided from a light source, and a channel structure 202 that is arranged around the beam path 201 and is configured to eject a powder-containing carrier gas (to be simply referred to as a carrier gas hereinafter) 270 toward the processing surface 260. The channel structure 202 includes three channel layers 220, 230, and 240 and one ejection layer 250.

The channel layer 220 includes an inflow port 221 through which the carrier gas 270 flows, two passage holes 222 through which the carrier gas 270 flowing from the inflow port 221 passes, and a channel 224 that guides the carrier gas 270 from the inflow port 221 to the passage holes 222.

The channel layer 230 includes two inflow ports 231 through which the carrier gas 270 flows, four passage holes 232 through which the carrier gas 270 flowing from the inflow ports 231 passes, and a channel 234 that guides the carrier gas 270 from the inflow ports 231 to the passage holes 232. The channel layer 230 is continuous with the channel layer 220, and the respective downstream openings of the passage holes 222 directly function as the inflow ports 231.

The channel layer 240 includes four inflow ports 241 through which the carrier gas 270 flows, eight passage holes 242 through which the carrier gas 270 flowing from the inflow ports 241 passes, and a channel 244 that guides the carrier gas 270 from the inflow ports 241 to the passage holes 242. The channel layer 240 is continuous with the channel layer 230, and the respective downstream openings of the passage holes 232 directly function as the inflow ports 241.

The ejection layer 250 includes eight inflow ports 251 through which the carrier gas 270 flows, a channel 252 through which the carrier gas 270 flowing from the inflow ports 251 passes, and an ejection port 253 from which the carrier gas 270 is ejected outside the optical processing nozzle 200 from the channel 252. The ejection layer 250 is continuous with the channel layer 240, and the respective downstream openings of the passage holes 242 directly function as the inflow ports 251.

The passage holes 222 are arranged to be spatially symmetrical with respect to the inflow port 221. The passage holes 232 are arranged to include at least one combination of a plurality of passage holes spatially symmetrical with respect to the inflow ports 231. The passage holes 242 are arranged to be spatially symmetrical with respect to the inflow ports 241. The passage holes 222 are arranged to be plane-symmetrical with respect to a plane including an optical axis 254 of the beam and passing through the center of the inflow port 221. Similarly, any two of the passage holes 232 are arranged to be plane-symmetrical with respect to a plane including the optical axis 254 of the beam and passing through the center of the inflow port 231. Also, any two of the passage holes 242 are arranged to be plane-symmetrical with respect to a plane including the optical axis 254 of the beam and passing through the center of the inflow port 241.

The ejection port 253 is arranged to be spatially symmetrical with respect to the optical axis 254 of the beam incoming from the beam path 201. In particular, the ejection port 253 is an annular slit rotationally symmetrical with respect to the optical axis 254. The ejection port 253 may be at least two arcuate slits arranged side by side on a circle. In other words, the channel structure 202 is constituted by fitting, around the beam path 201, four ring-shaped disks each having openings at the center and the periphery. The number of openings formed in the ring-shaped disks increases downstream.

As shown in FIG. 2, the channel 224 of the uppermost-stream channel layer 220 is ensured to be larger than the channels of the remaining channel layers 230 and 240 in order to reduce the pressure loss. The channel 252 of the lowermost-stream ejection layer 250 has a shape tapered toward the downstream side by a cover 255. This structure can converge a powder from the ejection port 253 toward the processing surface 260. That is, the diameter of a powder spot formed on the processing surface 260 can be decreased, and high-definition shaping becomes possible.

Figure 3:
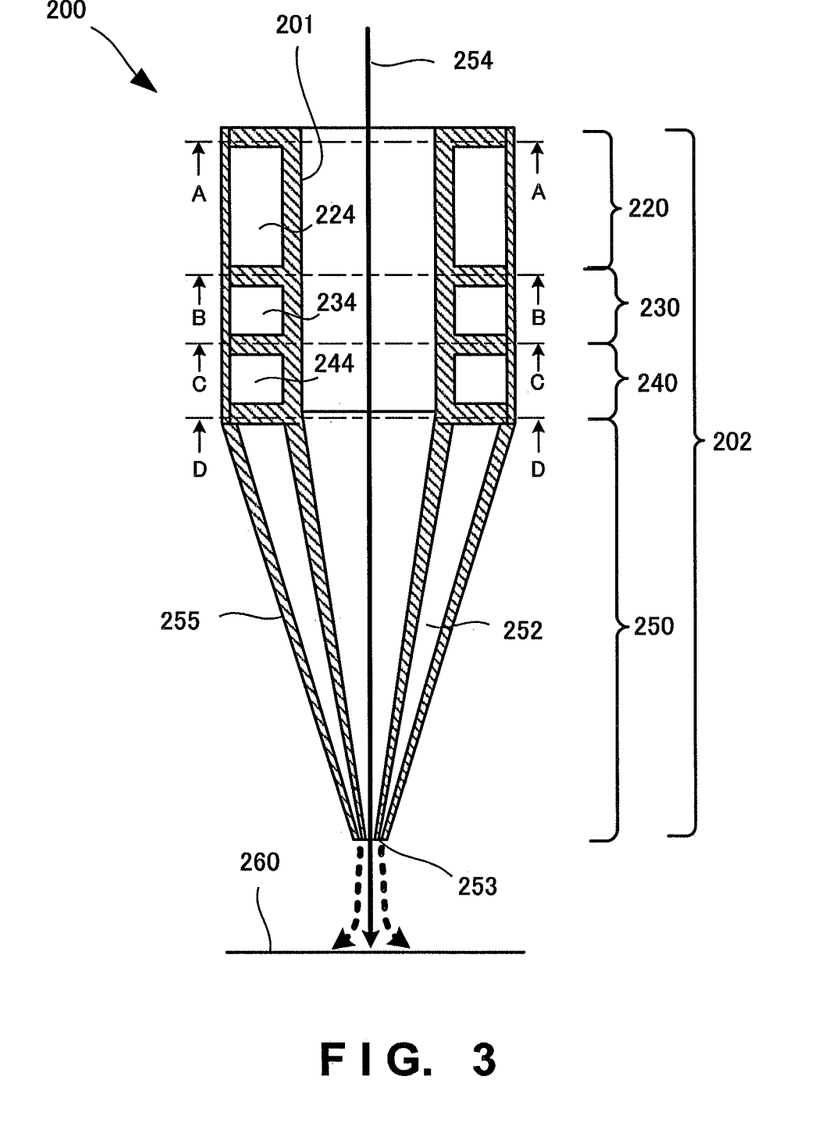
FIG. 3 is a sectional view showing the arrangement of the optical processing nozzle according to the second embodiment of the present invention.
Figure 4:
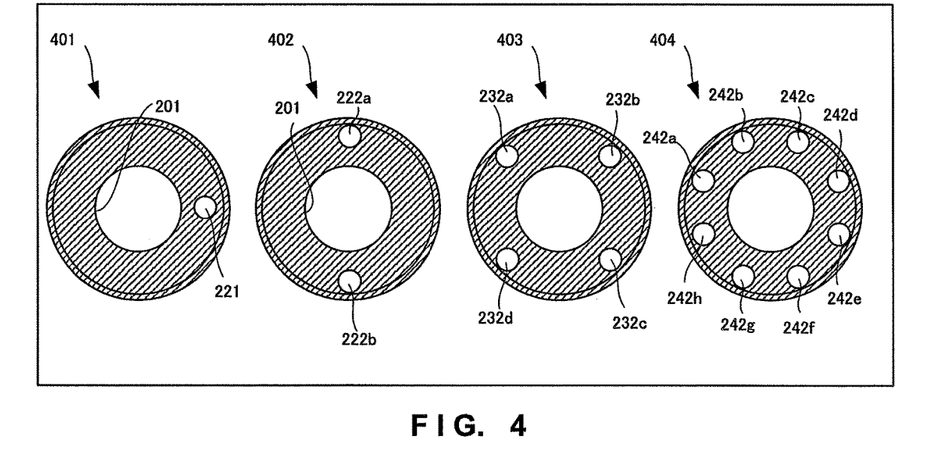
FIG. 4 is a sectional view showing the arrangement of the optical processing nozzle according to the second embodiment of the present invention.

FIG. 3 is a longitudinal sectional view showing the optical processing nozzle 200 taken along a plane passing through the optical axis. FIG. 4 is a view showing an A-A section 401, a B-B section 402, a C-C section 403, and a D-D section 404 in FIG. 3 in comparison. Each section corresponds to the sectional view of each ring-shaped disk of the channel structure 202. As shown in FIG. 4, the passage holes 222 (illustrated as passage holes 222a and 222b in FIG. 4 for convenience) are arranged to be spatially symmetrical with respect to the inflow port 221. Hence, a spatial gap from the inflow port 221 to the passage hole 222a and a spatial gap from the inflow port 221 to the passage hole 222b become equal, and the carrier gas flowing from the inflow port 221 equally flows into the passage holes 222a and 222b, and are discharged to the next layer.

In this embodiment, the positions of the inflow ports 231 on the section 402 are the same as those of the passage holes 222. The passage holes 232 (illustrated as passage holes 232a to 232d for convenience) are arranged to be spatially symmetrical (for example, arranged at an equal distance) with respect to the inflow ports 231. Also, the positions of the inflow ports 241 on the section 403 are the same as those of the passage holes 232. The passage holes 242 (illustrated as passage holes 242a to 242h for convenience) are arranged to be spatially symmetrical with respect to the inflow ports 241.

Referring to the positions of the passage holes 222a and 222b, a fluid passing through the passage hole 222a is equally guided to the passage holes 232a and 232b. Similarly, the fluid passing through the passage hole 222b is equally guided to the passage holes 232c and 232d. In the same way, the fluid passing through the passage hole 232a is equally guided to the passage holes 242a and 242b, and the fluid passing through the passage hole 232b is equally guided to the passage holes 242c and 242d. Similarly, the fluid passing through the passage hole 232c is equally guided to the passage holes 242e and 242f, and the fluid passing through the passage hole 232d is equally guided to the passage holes 242g and 242h.

This embodiment has explained the channel structure 202 including the three channel layers 220 to 240 having the inflow ports and the passage holes. However, the present invention is not limited to this, and the number of channel layers may be one, two, or four or more.

In this case, when an upstream side (side in a direction opposite to the beam direction) is defined as the Ath channel layer and a downstream side (side in the same direction as the beam direction) is defined as the Bth channel layer in all combinations each of two successive channel layers, it is preferable that the following relationship is established. That is, the Ath channel layer includes the Ath inflow port through which a fluid flows. The Ath channel layer also includes at least two Ath passage holes through which the carrier gas flowing from the Ath inflow port passes, and the Ath channel that guides the fluid from the Ath inflow port to the Ath passage holes. The Bth channel layer includes the Bth inflow port through which the fluid flows from the Ath passage holes. The Bth channel layer also includes at least two Bth passage holes through which the fluid flowing from the Bth inflow port passes, and the Bth channel that guides the fluid from the Bth inflow port to the Bth passage holes. The Ath passage holes are arranged to be spatially symmetrical with respect to the inflow direction of the Ath inflow port. The Bth passage holes are arranged to be spatially symmetrical with respect to the inflow direction of the Bth inflow port.

When two passage holes are associated with each inflow port in all channel layers, and M represents the total number of layers, the number of passage holes of the final layer is $2^M$. At this time, to maximize the isotropy of a powder ejected from the ejection port by the smallest number of layers, the distance (gap) between adjacent passage holes communicating with the ejection port suffices to be minimum. That is, the gap is set to be 0. This is because, when the gap is 0, the powder around the optical axis is equally distributed in all directions, and most isotropically distributed. At this time, letting R be the average distance of the passage hole communicating with the ejection port from the optical axis 254, and D be the diameter of the passage hole communicating with the ejection port, $$M = \frac{\log\left(\frac{2\pi R}{D}\right)}{\log 2}$$

That is, by arranging passage holes having the diameter D satisfying the above equation, a fluid can be made most isotropic by the smallest number of layers.

With this arrangement, a carrier gas flowing from the inflow port 221 can be equally divided inside the nozzle 200, and the isotropy of carriage gas ejection to the processing surfaced can be finally improved. Accordingly, a homogeneous powder spot without nonuniformity can be implemented. At this time, the processing accuracy of overlay welding or the like is improved by condensing a beam on the processing surface and forming a powder spot at a molten portion. Since the powder need not be equally branched at a supply portion (inlet portion) for supplying powder to the nozzle, the inlet portion can be simplified. As a result, the limitation of the movable range of the overall machining apparatus is reduced, and powder deposition at the inlet portion can be suppressed.

Third Embodiment

Figure 5:
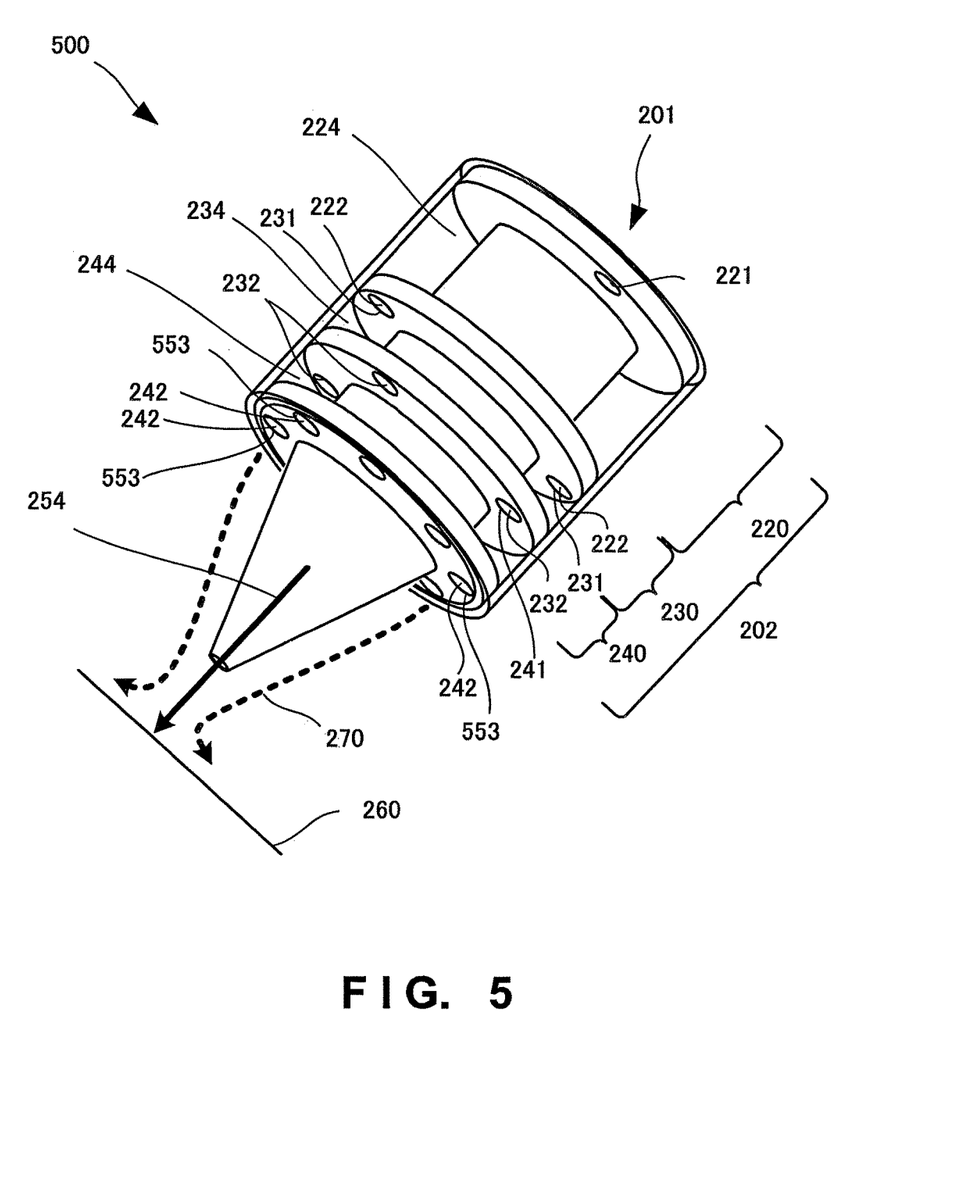
FIG. 5 is a view showing the arrangement of an optical processing nozzle according to the third embodiment of the present invention.

An optical processing nozzle 500 according to the third embodiment of the present invention will be described with reference to FIG. 5. FIG. 5 is a partial perspective view for explaining the arrangement of the optical processing nozzle 500 according to this embodiment. The optical processing nozzle 500 according to the third embodiment is different from the optical processing nozzle according to the second embodiment in that it does not include a cover 255. The remaining arrangement and operation are the same as those in the second embodiment, so the same reference numerals denote the same arrangement and operation and a detailed description thereof will not be repeated.

In this arrangement, the downstream openings of passage holes 242 directly serve as ejection ports 553. That is, the ejection ports 553 are constituted by a plurality of openings of the same shape. Even in this case, the ejection ports 553 are arranged to be spatially symmetrical with respect to an optical axis 254, as a matter of course.

Figure 6:
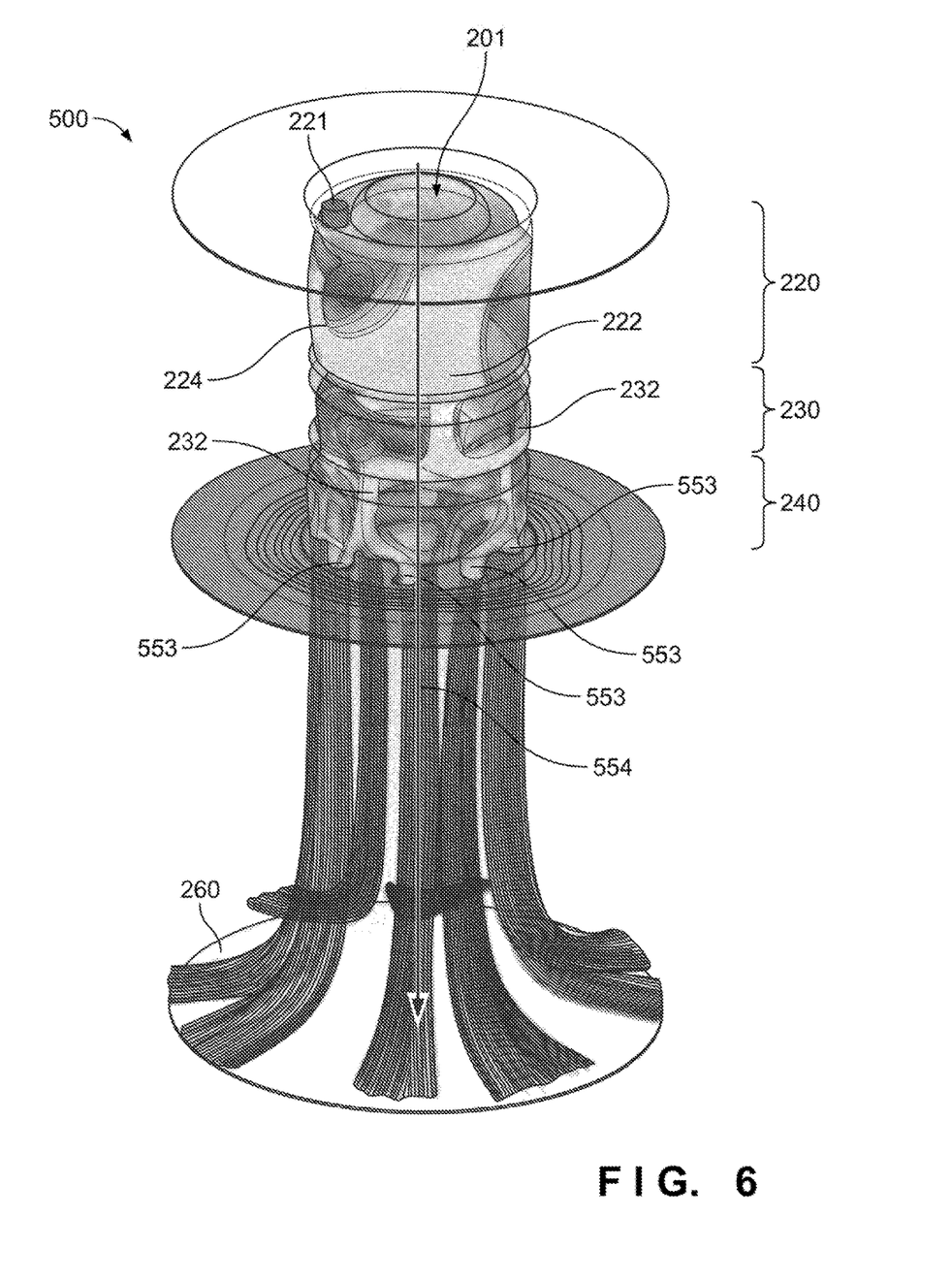
FIG. 6 is a view for explaining an effect obtained by the optical processing nozzle according to the third embodiment of the present invention.
Figure 7:
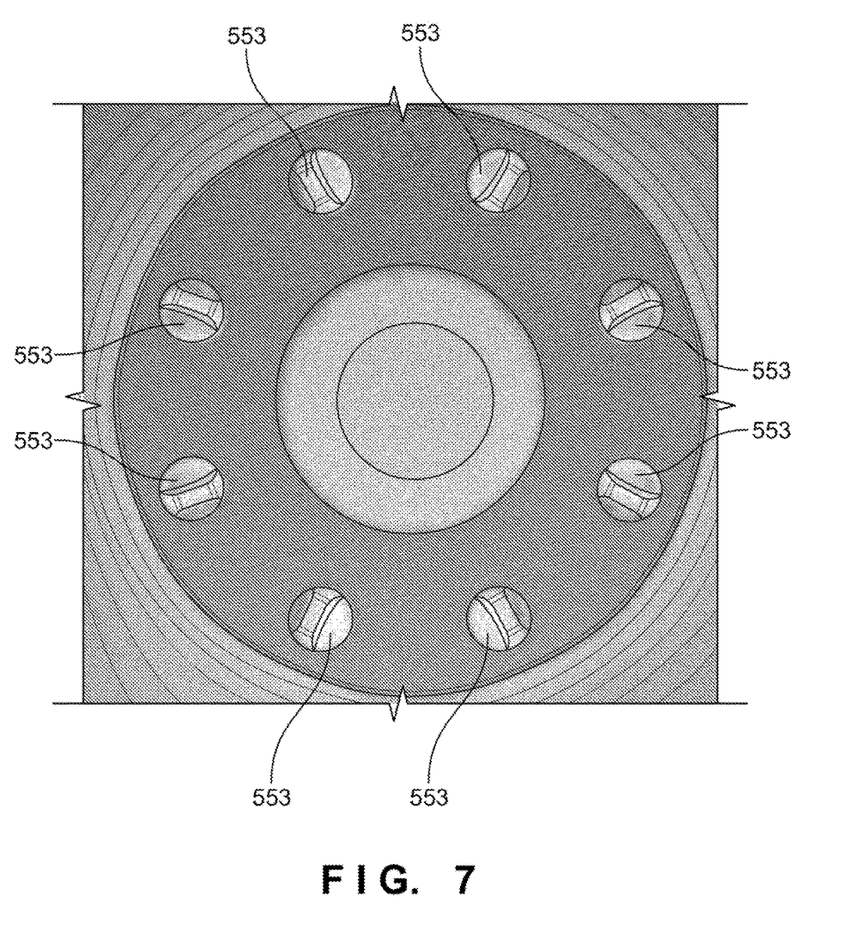
FIG. 7 is a view for explaining an effect obtained by the optical processing nozzle according to the third embodiment of the present invention.

FIGS. 6 and 7 show a fluid simulation result according to this embodiment. However, the cone shape of the distal end in FIG. 5 is not illustrated in the analysis model of this simulation. In the simulation, the fluid is, for example, a powder flow prepared by mixing SUS having a particle diameter of 30 μm in nitrogen gas serving as a carrier gas. FIG. 6 is a view showing the flow velocity distribution of the powder flow by grayscale concentration contour lines. As is apparent from FIG. 6, the powder flow is equally branched by the respective layers, and is distributed to be rotationally symmetrical (isotopically) with respect to the optical axis 254. FIG. 7 shows a flow velocity distribution on a section passing through the ejection ports 553. As is apparent from FIG. 7, the maximum concentration is almost equal between the ejection ports 553, and the maximum flow velocity is equal between the ejection ports 553. The flow rate can be calculated by integrating the flow velocity by the opening area of each ejection port. As a result, the flow rates in the respective ejection ports become almost equal, the variation becomes 5.2% or less, and the variation of the flow velocity becomes satisfactorily small. Experimental findings reveal that, if the variation is equal to or smaller than 10%, no anisotropy is observed in the property of a shaped object. In this example, the variation is about 5.2%, which is sufficiently small.

This simulation result can be referred to even for the arrangement described in the second embodiment in which the cover 255 is arranged. That is, even the arrangement described in the second embodiment can implement isotropic powder ejection.

Since no fluid is compressed at the time of ejection in the third embodiment, the pressure loss is small. That is, the third embodiment can implement a large powder spot diameter and enables high-speed shaping. By arranging the cover 255 to be easily detachable in the arrangement according to the second embodiment, the arrangement according to the second embodiment and the arrangement according to the third embodiment can be freely switched. That is, one nozzle can be used for two types of application purposes, that is, high-definition shaping and high-speed shaping.

Fourth Embodiment

Figure 8:
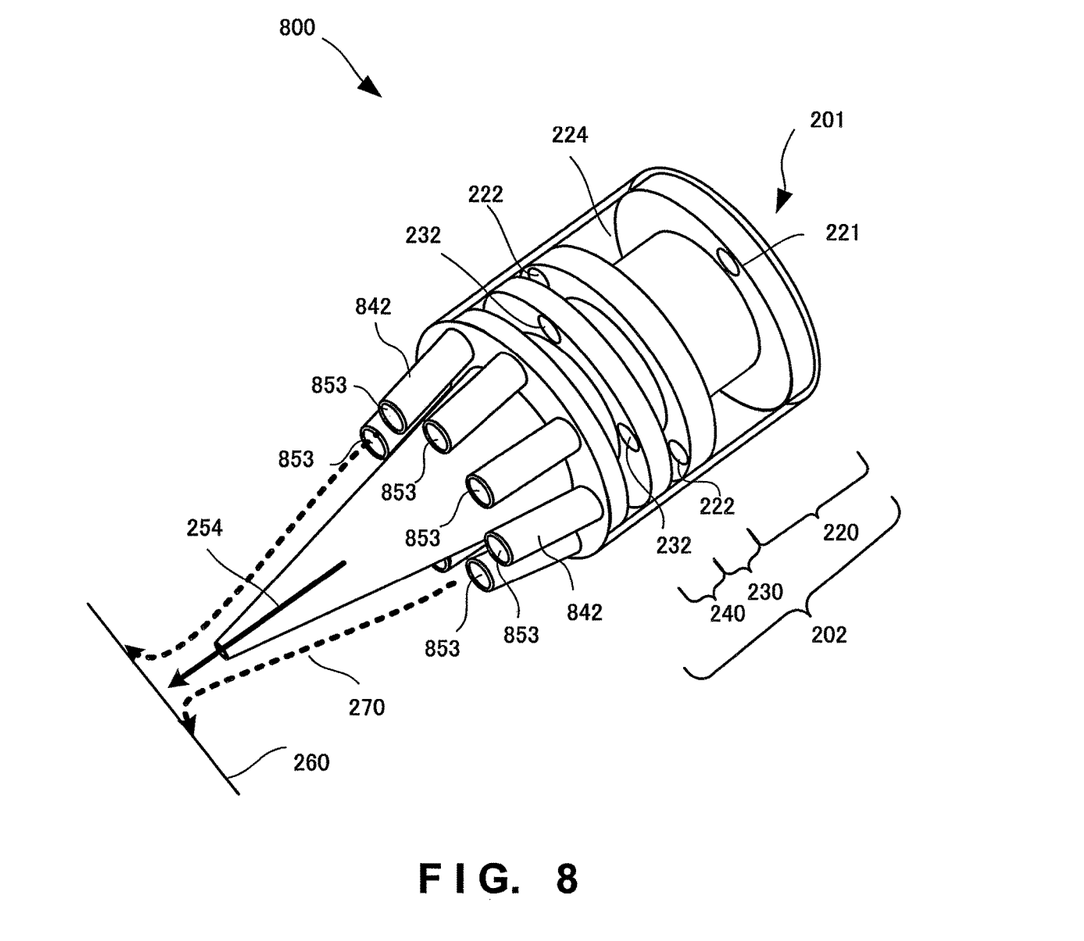
FIG. 8 is a view showing the arrangement of an optical processing nozzle according to the fourth embodiment of the present invention.

An optical processing nozzle 800 according to the fourth embodiment of the present invention will be explained with reference to FIG. 8. FIG. 8 is a partial perspective view for explaining the arrangement of the optical processing nozzle 800 according to this embodiment. The optical processing nozzle 800 according to the fourth embodiment is different from the optical processing nozzle according to the third embodiment in that it includes eight pipe-shaped passage holes 842 extending downstream from a channel layer 240, and the opening ends of the passage holes 842 serve as ejection ports 853. The remaining arrangement and operation are the same as those in the third embodiment, so the same reference numerals denote the same arrangement and operation and a detailed description thereof will not be repeated.

According to this embodiment, the ejection direction can be changed by changing the angles of the passage holes 842. The shape of a powder spot can therefore be controlled. If the passage holes 842 are made long, this gives an effect capable of reducing the variation of ejection and decreasing the powder convergent spot diameter. By orienting the ejection direction to a direction along a cone shape arranged at the distal end of the nozzle, a fluid can flow along the cone shape. That is, the flow of the fluid becomes a laminar flow along the wall surface of the cone shape. This can further enhance the powder convergence.

Fifth Embodiment

Figure 9:
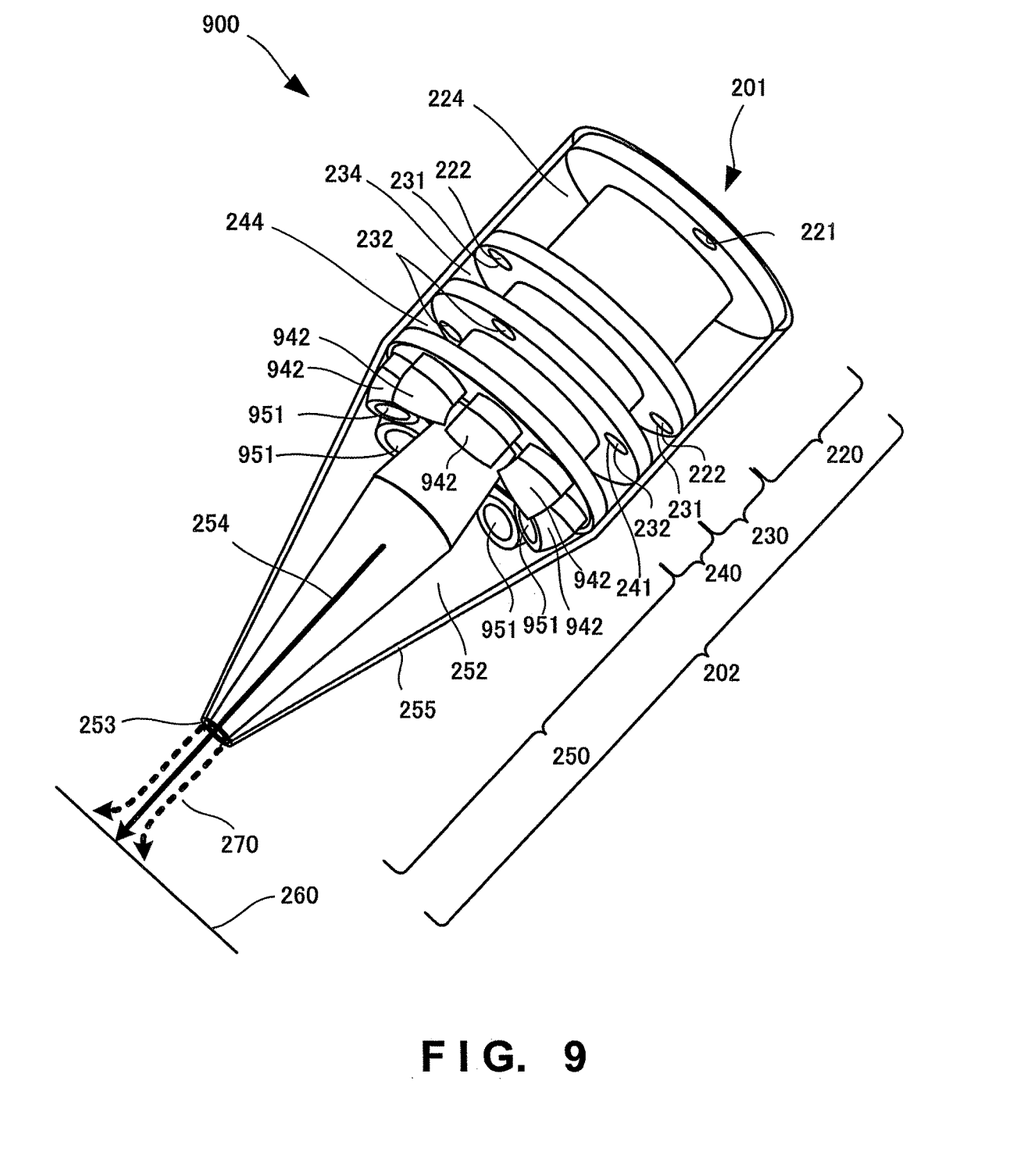
FIG. 9 is a view showing the arrangement of an optical processing nozzle according to the fifth embodiment of the present invention.

An optical processing nozzle 900 according to the fifth embodiment of the present invention will be explained with reference to FIG. 9. FIG. 9 is a partial perspective view for explaining the arrangement of the optical processing nozzle 900 according to this embodiment. The optical processing nozzle 900 according to the fifth embodiment is different from the optical processing nozzle according to the second embodiment in that it includes pipe-shaped passage holes 942 slightly extending downstream from a channel layer 240. The remaining arrangement and operation are the same as those in the second embodiment, so the same reference numerals denote the same arrangement and operation and a detailed description thereof will not be repeated.

According to this embodiment, a carrier gas is sprayed to the side surface of a cone shape formed in a cover 255, and is distributed. The carrier gas is satisfactorily equally distributed and ejected, improving the homogeneity.

The cone shape is constituted by a distribution portion at which a carrier gas is distributed, and a portion tapered toward the distal end. The distribution portion is tapered toward an upstream portion (opposite to the optical axis direction), but is not limited to this. For example, the distribution portion may be a cylinder.

Passage holes 942 are constituted so that they can be adjusted to an orientation in which a carrier gas is sprayed toward the distribution portion. The respective downstream openings of the passage holes 942 directly function as the inflow ports 951.

Sixth Embodiment

Figure 10:
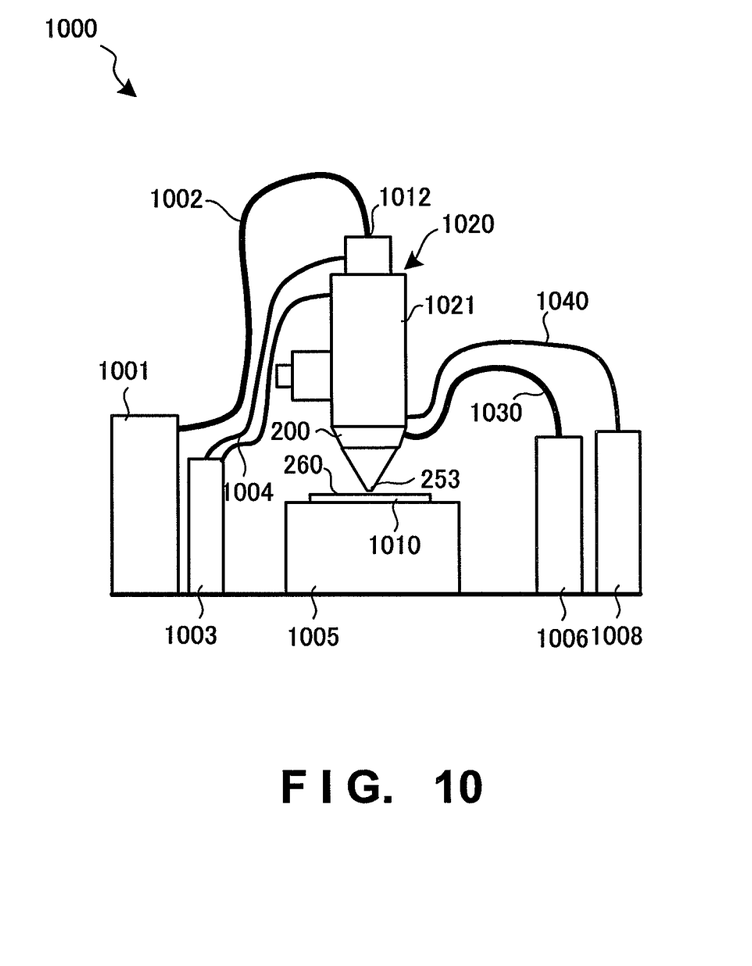
FIG. 10 is a view showing the overall arrangement of an optical machining apparatus according to the sixth embodiment of the present invention.

An optical machining apparatus 1000 according to the sixth embodiment of the present invention will be described with reference to FIG. 10. The optical machining apparatus 1000 is an apparatus that includes one of the optical processing nozzles 100, 200, 500, 800, and 900 explained in the above-described embodiments, and generates a three-dimensional shaped object (or overlay welding). Here, the optical machining apparatus 1000 including an optical processing nozzle 200 will be explained as an example.

Apparatus Arrangement

The optical machining apparatus 1000 includes a light source 1001, a light transmitting portion 1002, a coolant supply device 1003, a coolant supply portion 1004, a stage 1005, a fluid storage device 1006, a fluid supply portion 1030, a gas supply device 1008, a gas supply portion 1040, and an optical processing head 1020. The optical processing nozzle 200 is attached as part of the optical processing head 1020 to the distal end of the optical processing head 1020.

The light source 1001 can be, for example, a laser source, an LED, a halogen lamp, or a xenon lamp. The wavelength of a beam is, for example, 1,060 nm in the case of the laser source. However, the wavelength is not limited to this, and light is arbitrary as long as it is absorbed by a processing surface 260.

The light transmitting portion 1002 is, for example, an optical fiber having a core diameter of $\phi$0.01 to 1 mm, and guides light generated by the light source 1001 to the optical processing head 1020. The core diameter of the light transmitting portion 1002 serves as the diameter of an incident end 1012. The coolant supply device 1003 stores, for example, water as a coolant, and supplies the coolant by a pump to the coolant supply portion 1004.

The coolant supply portion 1004 is a resin or metal hose having an inner diameter of $\phi$2 to 6. The coolant is supplied into the optical processing head 1020, circulated inside it, and returned to the coolant supply device 1003, thereby suppressing the temperature rise of the optical processing head 1020. The coolant supply amount is, for example, 1 to 10 L/min.

The stage 1005 is, for example, an X stage, an X-Y stage, or an X-Y-Z stage, and the respective axes (X, Y, and Z) can be driven. The fluid storage device 1006 supplies a material-containing carrier gas to the optical processing nozzle 200 via a fluid supply portion 1030. The material is, for example, a particle such as a metal particle or a resin particle. The carrier gas is an inert gas and can be, for example, argon gas, nitrogen gas, or helium gas.

The fluid supply portion 1030 is, for example, a resin or metal hose, and guides, to the nozzle 200, a powder flow prepared by mixing a material in a carrier gas. However, when the material is a wire, no carrier gas is necessary.

The gas supply device 1008 supplies a purge gas to the optical processing head 1020 through the gas supply portion 1040. The purge gas is, for example, nitrogen, argon, or helium. However, the purge gas is not limited to this and may also be another gas as long as the purge gas is an inert gas. The purge gas supplied to the optical processing head 1020 is ejected from the nozzle 200 along the above-described beam. The optical processing head 1020 includes at least the optical processing nozzle 200 explained in the above-described embodiment, and a condensing optical system device 1021 that condenses light emitted by the light source 1001 and ejects it toward the processing surface 260.

Although not shown, the optical machining apparatus 1000 may include an orientation control mechanism and position control mechanism that control the orientation and position of the optical processing head 1020.

Apparatus Operation

Next, the operation of the optical machining apparatus 1000 will be explained. A shaped object 1010 is created on the stage 1005. Light emitted by the optical processing head 1020 is condensed to the processing surface 260 on the shaped object 1010. The temperature of the processing surface 260 is raised by the condensed light, and the processing surface 260 is melted, partially forming a molten pool.

The material is ejected from the nozzle 200 to the molten pool of the processing surface 260. The material is melted into the molten pool. After that, the molten pool is cooled and hardened to deposit the material on the processing surface 260, implementing three-dimensional shaping.

The purge gas is ejected from the nozzle 200 to the processing surface 260. Thus, the peripheral environment of the molten pool is purged with the purge gas. By selecting an oxygen-free inert gas as the purge gas, oxidization of the processing surface 260 can be prevented.

The optical processing head 1020 is cooled by the coolant supplied from the coolant supply device 1003 through the coolant supply portion 1004, suppressing the temperature rise during processing.

By scanning the optical processing head 1020 along the processing surface 260 at the same time as the above-described series of operations, desired shaping can be performed while depositing the material. That is, this apparatus can implement overlay welding or three-dimensional shaping.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. An optical processing nozzle for three-dimensional shaping comprising:
    a beam path that is arranged to allow a beam, which is emitted by a light source and melts a powder as a processing material, to pass through the beam path towards a processing surface;
    a channel structure that is arranged around the beam path and is configured to eject a carrier gas for carrying the powder towards the processing surface, and
    first, second, and third ring-shaped disks, wherein the first ring-shaped disk includes an inflow port, the second ring-shaped disk includes at least two passage holes, and the third ring-shaped disk includes at least four passage holes,
    wherein the channel structure comprises:
    a first channel layer defined by an inner wall surface of the channel structure, the first ring-shaped disk and the second ring-shaped disk,
    a second channel layer defined by the inner wall surface of the channel structure, the second ring-shaped disk and the third ring-shaped disk,
    wherein the carrier gas flows in the first channel layer through the inflow port of the first ring-shaped disk in the same direction as a beam direction, flows out from the first channel layer and flows in the second channel layer through the at least two passage holes of the second ring-shaped disk in the same direction as the beam direction, and then flows out from the second channel layer through the at least four passage holes of the third ring-shaped disk in the same direction as the beam direction; and an ejection port from which the carrier gas forced out through the at least four passage holes is ejected toward the processing surface, wherein the second channel layer is arranged between the first channel layer and the processing surface, wherein the at least two passage holes of the second ring-shaped disk, are arranged to be spatially symmetrical with respect to the inflow port of the first ring-shaped disk, wherein the at least four passage holes of the third ring-shaped disk are arranged to be spatially symmetrical with respect to the at least two passage hole of the second ring-shaped disk, wherein the ejection port is arranged to be spatially symmetrical with respect to an optical axis of a beam coming out from the beam path, and wherein said channel structure further includes:

a fourth ring-shaped disk, wherein the fourth ring-shaped disk comprises at least eight passage holes, and a third channel layer defined by the inner wall surface of the channel structure, the third ring-shaped disk and the fourth ring-shaped disk, wherein the carrier gas flows in the third channel layer through the at least four passage holes of the third ring-shaped disk in the same direction as the beam direction, and then flows out from the third channel layer through the at least eight passage holes of the forth ring-shaped disk in the same direction as the beam direction, wherein the third channel layer is arranged between the second channel layer and the processing surface, and wherein the at least eight passage holes of the fourth ring-shaped disk are arranged to be spatially symmetrical with respect to the at least four passage holes of the third ring-shaped disk.

2. The optical processing nozzle according to claim 1, wherein a channel extending from passage holes of a channel layer positioned on a lowermost stream to the ejection port has a shape tapered toward a downstream side.

3. The optical processing nozzle according to claim 1, wherein the at least two passage holes of the second ring-shaped disk are arranged to be plane-symmetrical with respect to a plane including the optical axis of the beam and passing through a center of the inflow port.

4. The optical processing nozzle according to claim 1, wherein the ejection port includes at least two ejection ports that are identical in shape, and are arranged at positions to be rotationally symmetrical with respect to the optical axis.

5. The optical processing head according to claim 1, wherein the ejection port is an annular or arcuate slit.

6. The optical processing nozzle according to claim 1, wherein the at least two passage holes of the second ring-shaped disk include at least one pair of passage holes arranged at an equal distance from the inflow port.

7. The optical processing nozzle according to claim 1, wherein the first ring-shaped disk has one inflow port, the second ring-shaped disk has two passage holes, the third ring-shaped disk has four passage holes, and the fourth ring-shaped disk has eight passage holes, and letting R be an average distance of the ejection port from the optical axis, D be a diameter of a passage hole communicating with the ejection port, and M be the total number of channel layers, $$M = \frac{\log\left(\frac{2\pi R}{D}\right)}{\log 2}$$

is established.

8. An optical processing head for three-dimensional shaping comprising:

an optical processing nozzle defined in claim 1; and a condensing optical system device that condenses light emitted by a light source and ejects the light toward a processing surface.

9. An optical machining apparatus comprising:

an optical processing head defined in claim 8;

a light source;

a light transmitting portion that transmits light emitted by said light source to said optical processing head;

a carrier gas storage device that stores the carrier gas; and a carrier gas supply portion that supplies the carrier gas to said optical processing nozzle.

10. The optical processing nozzle according to claim 1, wherein the first channel layer has a height that is greater than that of the second channel layer.

11. The optical processing nozzle of claim 1, wherein the diameter of the first and second channel layers as defined by the first, second, and third ring-shaped disks is the same.

* * * * *